United States Patent [19]

Eimers et al.

[11] 4,128,532

[45] Dec. 5, 1978

[54] POLYETHERESTERS WHICH CONTAIN HYDROXYL GROUPS AND THE USE THEREOF IN THE PRODUCTION OF FLAME RESISTANT SYNTHETIC RESINS

[75] Inventors: Erich Eimers; Rolf Dhein, both of Krefeld-Bockum; Rolf Wiedermann, Bergisch-Gladbach, all of Germany

[73] Assignee: Bayer Aktiengesellschaft, Leverkusen, Germany

[21] Appl. No.: 853,616

[22] Filed: Nov. 21, 1977

Related U.S. Application Data

[63] Continuation of Ser. No. 620,724, Oct. 8, 1975, abandoned.

[30] Foreign Application Priority Data

Oct. 24, 1974 [DE] Fed. Rep. of Germany ....... 2450539

[51] Int. Cl.$^2$ ................... C08G 63/66; C08G 63/68
[52] U.S. Cl. ..................................... 528/79; 521/171; 521/172; 560/85; 560/193
[58] Field of Search ....... 260/47 C, 2.5 AW, 2.5 AN, 260/2.5 AV, 75 NK, 77.5 AN

[56] References Cited

U.S. PATENT DOCUMENTS

| | | | |
|---|---|---|---|
| 3,234,167 | 2/1966 | Sweeny | 260/30.4 |
| 3,304,286 | 2/1967 | Altscher et al. | 260/47 |
| 3,704,279 | 11/1972 | Ismail | 260/61 |
| 3,786,022 | 1/1974 | Hata et al. | 260/47 C |
| 3,787,526 | 1/1974 | Burns et al. | 260/860 |
| 3,794,617 | 2/1974 | Mains et al. | 260/47 C |
| 3,887,523 | 6/1975 | Yau et al. | 260/47 C |
| 3,935,166 | 1/1976 | Kanai et al. | 260/47 C |

Primary Examiner—Lester L. Lee
Attorney, Agent, or Firm—Gene Harsh; Joseph C. Gil; William E. Parry

[57] ABSTRACT

The instant invention is broadly directed to novel polyether esters and the use thereof in manufacturing polyurethane resins. The novel products are produced by esterifying an alkoxylated, halogenated bisphenol, a polycarboxylic acid and a dihydric alcohol.

9 Claims, No Drawings

POLYETHERESTERS WHICH CONTAIN HYDROXYL GROUPS AND THE USE THEREOF IN THE PRODUCTION OF FLAME RESISTANT SYNTHETIC RESINS

This is a continuation, of application Ser. No. 620,724 filed Oct. 8, 1975 and now abandoned.

BACKGROUND OF THE INVENTION

Bis-β-hydroxyalkyl ethers of halogenated bisphenols are known and are used as hydroxyl components for the production of flame-resistant synthetic resins. These bis-ethers are generally solid crystalline or vitreous (i.e. glass-like) resins. Esters of these ethers with dicarboxylic acids are also known and have been used for the production of flame-resistant synthetic resins. For example, the production of an ester by esterification of bis-β-hydroxyethyl dibromobisphenol and 1,2-propylene glycol with a mixture of phthalic acid anhydride and maleic acid anhydride has been described in Canadian Pat. No. 663,542. This ether contains 25.2% of bromine and is a vitreous resin at room temperature. For producing polyurethane and polyisocyanurate resins, however, it is advantageous to use liquid or low viscosity starting components so that the foaming mixture may be poured.

Polyethers which contain free hydroxyl groups, e.g. polyethylene glycol or polypropylene glycol, have long been used as low viscosity components for producing polyurethane and polyisocyanurate resins. Hydroxyl-containing polyethers of bisphenols are also known for this purpose. It appears from U.S. Application Ser. No. 373,230, filed June 25, 1973, now abandoned, that polyethers of halogenated bisphenols cannot be produced under conventional operating conditions. The treatment of highly halogenated bisphenols, such as tetrabromobisphenol, with alkylene oxides merely results in bis-ethers of the type mentioned above, even when an excess of alkylene oxide is used.

It would be an obvious solution to dissolve these bis-ethers in low-viscosity polyalkylene glycols in order to incorporate them in the foaming mixture as halogen carriers for producing flame-resistant foams. However, it is very difficult to dissolve these bis-ethers in such hydroxyl compounds. The ether either quickly crystallizes from solutions containing it at the required concentrations or the solution solidifies to a solid crystalline paste which is no longer pourable. It is true that low-viscosity, pourable polyether derivatives of halogenated bisphenols could be obtained in accordance with U.S. Application No. 373,230 by first preparing the hydroxyl polyethers of halogen-free bisphenols in known manner and then halogenating them with elemental halogen, such as bromine. The polyethers obtained in this way have a pourable consistency and the foams produced from them, and in particular, polyisocyanurate foams, have excellent fire characteristics. However, these foams have the disadvantage that the surface tends to become brittle and the adherence to the covering layers is poor. Moreover, the procedure described in the above-mentioned U.S. application is complicated in practice because polyetherification and halogenation are two completely separate reactions each of which requires special apparatus so that they must be carried out in two separate production units. In view of the high costs of apparatus (use of corrosion-resistant apparatus, e.g. of special steel) for halogenation, it is desirable to achieve a high degree of halogenation in order to make efficient use of the apparatus. It is, therefore, more rational to use a highly halogenated starting material for producing a halogenated flame-resistant resin or its precursor than to halogenate this resin or precursor subsequently to the required, lower degree of halogenation.

DESCRIPTION OF THE INVENTION

It has now been found that a low-viscosity starting material containing halogen and hydroxyl groups for producing flame-resistant polyurethane and polyisocyanurate resins may be prepared by a very simple process and the finished products produced from this starting material, e.g. isocyanurate foams, are found not to become brittle and are found to adhere firmly to the covering layers (see Example 9 herein).

According to the instant invention, halogenated bisphenol-bis-β-hydroxyalkylethers which may be prepared in the conventional manner are used as starting materials and are esterified with a dicarboxylic or polycarboxylic acid in the presence of an excess of dialkylene or polyalkylene glycol. Furthermore, it has been found that it is not necessary to prepare the bis-ether separately and to isolate it in bulk. Instead, to simplify the preparation of the products according to the invention, a bisphenol which is halogenated in the nucleus can be dissolved in a dialkylene or polyalkylene glycol. The phenolated groups of the bisphenol can then be alkoxylated by the addition of an alkylene oxide at elevated temperature and the resulting mixture of bis-ethers and polyalkylene glycol can be esterified. The new polyether esters obtained in this way may contain 50% or more of halogenated bisphenol-bis-ethers (chemically-bound). The products have a low viscosity and hydroxyl numbers of from about 100 to 300, depending on the amount of excess of di- or polyalkylene glycol employed.

The invention therefore relates to hydroxyl-containing polyether esters having an acid number of from 0 to 5, preferably from 0 to 1, and a hydroxyl number of from 100 to 300, preferably from 150 to 250, obtained by the esterification of:

(a) bis-hydroxyalkyl ethers of halogenated 2,2-diphenylolpropanes corresponding to the general formula:

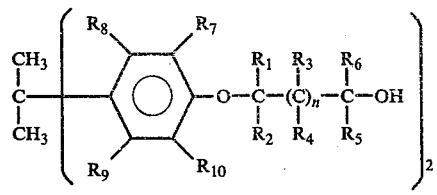

wherein
$R_1$ through $R_6$ may be the same or different and each represent H, $C_1$–$C_4$ alkyl, and preferably represent H, $CH_3$ and $C_2H_5$; and
$R_7$ through $R_{10}$ may be the same or different, and each represent H, $C_1$–$C_4$ alkyl or halogen, and preferably represent H, Br, Cl, $CH_3$ or $C_2H_5$; and, at least one of the groups $R_7$–$R_{10}$ is a halogen atom, and preferably a bromine atom;

(b) saturated and/or unsaturated aliphatic and/or aromatic polycarboxylic acids; and, (c) dihydric alcohols corresponding to the following general formula:

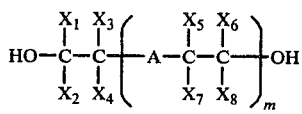

wherein
$X_1$ through $X_8$ may be the same or different and each represent H or $C_1$-$C_4$ alkyl, and preferably represent H, $CH_3$ or $C_2H_5$;
m represents 1 to 10; and
A represents 0 or S.

The products of the instant invention retain their liquid consistency even when stored at low temperatures, in spite of the high proportion of high melting bisphenol bis-ethers contained in them. This is particularly surprising because in view of the large excess of hydroxyl groups present in the esterification reaction, one would assume that part of the bis-ether in the resulting ester mixture would be in an unesterified or semi-esterified form and therefore liable to crystallize.

The polyether esters according to the invention generally have a viscosity of from 10 to 200 Poises/25° C., and preferably from 20 to 100 Poises/25° C.

Bisphenols of the following structure may be used as starting material for the polyether esters according to the invention:

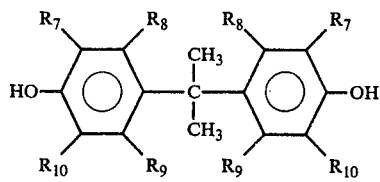

wherein
$R_7$, $R_8$, $R_9$ and $R_{10}$ may be the same or different and each representing H, $C_1$-$C_4$ alkyl or halogen, and at least one such substituent represents halogen. Preferably $R_7$ through $R_{10}$ represent H, $CH_3$, $C_2H_5$, Cl or Br.
Tetrabromobisphenol of the formula:

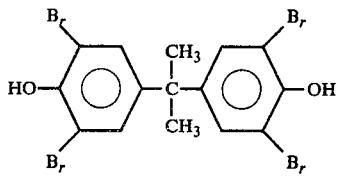

is preferably used as starting material. Tetrachlorobisphenol and dibromobisphenol are also preferable starting materials for preparing the products according to the invention.

In accordance with the described variation of the process, these bisphenols may be directly alkoxylated with di- or polyalkylene glycols in solution and subsequently esterified. Essentially any of the known alkylene oxides may be used to alkoxylate. Substances which are alkaline in reaction may be used as catalysts for the alkoxylation in the di- or polyalkylene glycol solution. Such catalysts include NaOH, KOH, sodium methylate, sodium phenolate, potassium acetate, potassium carbonate, and the like. Alkoxylation may be carried out at temperatures of from 80° to 180° C., preferably from 110° to 140° C., in known manner.

The bisphenol-bis-ethers which may be used as starting components for esterification include those compounds which may be obtained by reacting halogenated bisphenols with, e.g. ethylene oxide, 1,2-propylene oxide, epichlorohydrin, 1,2-butylene oxide or 3-hydroxymethyl-3-ethyl oxetane. If desired, alkoxylation to produce the bisethers may be carried out with alkylene carbonates in known manner instead of with alkylene oxides. Suitable carbonates include: ethylene carbonate, 1,2-propylene carbonate, 1,2-butylene carbonate and glycerol carbonate.

The acids used for esterifying the bis-ethers in accordance with the invention may be aliphatic, cycloaliphatic or aromatic polycarboyxlic acids including succinic acid, adipic acid, sebacic acid, diglycolic acid, thiodiglycolid acid, maleic acid, fumaric acid, citric acid, cyclohexane dicarboxylic acid, tetrahydrophthalic acid, endomethylene tetrahydrophthalic acid, endomethylene hexachlorotetrahydrophthalic acid (HET acid), ortho-, iso- and tere-phthalic acids, tetrachlorophthalic acid, tetrabromophthalic acid and trimellitic acid. Instead of the free polycarboxylic acids, the corresponding polycarboxylic acid anhydrides or esters of lower alcohols or mixtures thereof may be used for preparing the polyesters. If desired, mixtures of the acids may be used.

Suitable dihydric alcohols in accordance with the general formula indicated above include, in particular, diethylene glycol and polyethylene glycols corresponding to the formula:

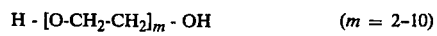

$$H - [O\text{-}CH_2\text{-}CH_2]_m - OH \qquad (m = 2\text{-}10)$$

as well as thiodiglycol, bis-β-hydroxyethyl sulphone and the polyethers and polythioethers mentioned below as well as dipropylene glycol and polypropylene glycol of the formula:

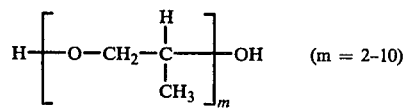

$\qquad (m = 2\text{-}10)$

In addition to the above-mentioned diols, up to 20 mols% of monoalkylene glycols, such as ethylene glycol, 1,2-propylene glycol, 1,2-butylene glycol, neopentyl glycol or α-chlorohydrin may be included for esterification.

Esterification is generally carried out at temperatures of from 120° to 200° C., and preferably from 140° to 170° C., with the introduction of a stream of inert gases at normal pressure or under vacuum. Esterification catalysts, such as toluenesulphonic acid, litharge, dibutyl tin oxide, antimony trioxide, salts and alcoholates of titanium, may be added. Solvents may be used as azeotropic carriers for the esterification reaction although esterification is preferably carried out in the absence of solvents.

A small acid number often remains after esterification in spite of the high glycol excess used and does not disappear even with continued heating under esterification conditions.

In cases where the residual acid number, which is generally below 10, interferes with working-up of the ester, it may be completely removed by treating the ester with alkylene oxides at temperatures of from 100° to 150° C., preferably from 120 to 130° C. The alkylene oxides mentioned above may be used for this purpose.

The polyether esters according to the invention are valuable starting materials for the production of synthetic resins based on isocyanates, and in particular, for the production of non-inflammable isocyanurate foams which have excellent mechanical properties and high flame resistance.

The starting isocyanates used with the polyether esters of the instant invention include aliphatic, cycloaliphatic, araliphatic, aromatic and heterocyclic polyisocyanates, such as those described, e.g. by W. Siefken in Justus Liebigs Annalen der Chemie, 562, pages 75 to 136. Specific examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethylcyclohexane (German Auslegeschrift No. 1,202,785; U.S. Pat. No. 3,401,190); hexahydrotolylene-2,4- and -2,6-diisocyanate and mixtures of these isomers; hexahydrophenylene-1,3- and/or -1,4-diisocyanate; perhydrodiphenylmethane-2,4'- and/or -4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenylmethane-4,4',4"-triisocyanate; polyphenol-polymethylene polyisocyanates of the type obtained by aniline-formaldehyde condensation followed by phosgenation such as have been described, in British Pat. 874,430 and 848,671; m- and p-isocyanatophenyl sulphonyl isocyanates as described in U.S. Pat. No. 3,454,606; perchlorinated aryl polyisocyanates as described in U.S. Pat. 3,277,138; polyisocyanates which contain carbodiimide groups as described in U.S. Pat. No. 3,152,162; diisocyanates of the type described in U.S. Pat. No. 3,492,330; polyisocyanates which contain allophanate groups as described in British Pat. No. 994,890, Belgian Pat. No. 761,626 and published Dutch Patent Application 7,102,524; polyisocyanates which contain isocyanurate groups as described in U.S. Pat. No. 3,001,973, in German Patents No. 1,022,789; 1,222,067 and 1,027,394, and in German Offenlegungsschriften Nos. 1,929,034 and 2,004,048; polyisocyanates which contain urethane groups as described in Belgian Pat. No. 752,261 or in U.S. Pat. No. 3,394,164; polyisocyanates which contain acylated urea groups as described in German Pat. No. 1,230,778; polyisocyanates which contain biuret groups as described in U.S. Pat. Nos. 3,124,605 and 3,201,372; and in British Pat. No. 889,050; polyisocyanates prepared by telomerization reactions as described in U.S. Pat. No. 3,654,106; polyisocyanates which contain ester groups as described in British Pat. Nos. 965,474 and 1,072,956, in U.S. Pat. No. 3,567,763 and in German Patent 1,231,688; reaction products of the above-mentioned isocyanates with acetals as described in German Pat. No. 1,072,385; and polymeric polyisocyanates which contain fatty acid groups as described in U.S. Pat. No. 3,455,883. The distillation residues obtained from the commercial production of isocyanates and still containing isocyanate groups may also be used, optionally dissolved in one or more of the above-mentioned polyisocyanates. Mixtures of the above-mentioned polyisocyanates may also be used.

It is generally preferred to use readily available polyisocyanates such as tolylene-2,4- and 2,6-diisocyanate and mixtures of these isomers ("TDI"); polyphenyl-polymethylene polyisocyanates which may be prepared by aniline-formaldehyde condensation followed by phosgenation ("crude MDI"); and polyisocyanates which contain carbodiimide groups, urethane groups, allophanate groups, isocyanurate groups, urea groups or biuret groups ("modified polyisocyanates").

According to the invention, water and/or readily volatile organic substances can be used as blowing agents. Suitable organic blowing agents include acetone; ethyl acetate; halogenated alkanes, such as methylene chloride, chloroform, ethylidene chloride, vinylidene chloride, monofluorotrichloromethane, chlorodifluoromethane, dichlorodifluoromethane; butane; hexane; heptane; and diethyl ether. Compounds which decompose at temperatures above room temperature to liberate gases, such as nitrogen, e.g. azo compounds, such as azoisobutyric acid nitrile, may also be used as blowing agents. Other examples of blowing agents and details concerning the use thereof may be found in Kunststoff-Handbuch, Volume VII, published by Vieweg and Hochtlen, Carl-Hanser-Verlag, Munich, 1066, pages 108 and 109, 453 to 455 and 507 to 510.

Where isocyanurate products are desired, catalysts used for such polymerization reactions may be used and include compounds which initiate a polymerization reaction of the NCO-group at room temperature. Compounds of this type have been described, for example, in French Pat. No. 1,441,565, Belgian Pat. Nos. 723,153 and 723,152 and German Pat. 1,112,285. Particularly suitable catalysts of this type are the mono- or polynuclear Mannich bases obtained from condensable phenols, optionally substituted with alkyl, aryl, or aralkyl groups, oxo-compounds and secondary amines, especially those in which formaldehyde has been used as the oxo-compound and dimethylamine as secondary amine. According to IR spectroscopic analyses, substantial quantities of carbodiimide structures are generally formed in the foams, the quantity varying according to the conditions, and in particular the reaction temperature reached. Other suitable polyisocyanurate catalysts include alkali metal and alkaline earth metal salts of carboxylic acids and phenols. The quantity of polymerization catalyst used is mainly determined by the nature of the catalyst (and in some cases its basicity). The catalyst component may be used in quantities of from 0.1 to 100% by weight, preferably from 0.3 to 25% by weight, based on the isocyanate component.

According to the invention, conventional catalysts may be used for the polyurethane reaction, including tertiary amines, such as triethylamine, tributylamine, N-methyl-morpholine, N-ethyl morpholine, N-cocomorpholine, N,N,N',N'-tetramethylethylene diamine, 1,4-diaza-bicyclo-(2,2,2)-octane, N-methyl-N'-dimethylaminoethyl-piperazine, N,N-dimethyl benzylamine, bis-(N,N-diethylaminoethyl) adipate, N,N-diethyl benzylamine, pentamethyl diethylene triamine, N,N-dimethyl cyclohexylamine, N,N,N',N'-tetramethyl-1,3-butane diamine, N,N-dimethyl-$\beta$-phenyl ethylamine, 1,2-dimethyl imidazole and 2-methyl imidazole. Tertiary amines containing hydrogen atoms which are reactive with isocyanate groups may also be used and include triethanolamine, triisopropanolamine, N-methyl-diethanolamine, N-ethyl diethanolamine, N,N-dimethyl ethanolamine and reaction products thereof with alkylene oxides, such as propylene oxide and/or ethylene oxide.

Silaamines which contain carbon-silicon bonds may also be used as catalysts, such as those described in German Pat. No. 1,229,290 including 2,2,4-trimethyl-2-silamorpholine or 1,3-diethylaminomethyl-tetramethyldisiloxane.

Organo-metal compounds, such as organo-tin compound may also be used as polyurethane catalysts according to the invention.

The organo-tin compounds used are preferably tin-(II)-salts of carboxylic acids, such as tin(II)-acetate, tin(II)-octoate, tin(II)-ethyl hexoate and tin(II)-laurate, and the dialkyl tin salts of carboxylic acids, such as dibutyl tin diacetate, dibutyl tin dilaurate, dibutyl tin maleate or dioxtyl tin diacetate.

Other examples of catalysts which may be used according to the invention and the mode of action of the catalysts have been described in Kunststoff-Handbuch, Volume VII, published by Vieweg and Hochtlen, Carl-Hanser-Verlag, Munich 1966, pages 96 to 102.

These catalysts are generally used in quantities of from about 0.001 to 10% by weight, based on the total weight of the polyether esters of the instant invention and any compounds mentioned below which have a molecular weight of from 62 to 10,000 and contain at least two hydrogen atoms which are reactive with isocyanates.

Surface-active additives (emulsifiers and foam stabilizers) may also be used according to the invention. Suitable emulsifiers include the sodium salts of ricinoleic sulphonates, or of fatty acids, or salts of fatty acids with amines, such as oleic acid diethylamine or stearic acid diethanolamine. Alkali metal or ammonium salts of sulphonic acids, such as dodecyl benzene sulphonic acid or dinaphthyl methane disulphonic acid, or of fatty acids, such as ricinoleic acid, or of polymeric fatty acids, may also be used as surface-active additives.

The foam stabilizers used are mainly water-soluble polyether siloxanes. These compounds generally have a copolymer of ethylene oxide and propylene oxide attached to a polydimethyl siloxane group. Foam stabilizers of this type are known and have been described in U.S. Pat. Nos. 2,834,748; 2,917,480 and 3,629,308.

Reaction retarders may also be used according to the invention, e.g. substances which are acid in reaction, such as hydrochloric acid or organic acid halides. Other additives which may be used include cell regulators, such as paraffins or fatty alcohols or dimethyl polysiloxanes; pigments; dyes; flame-retarding agents and a tris-chloroethyl phosphate or ammonium phosphate and polyphosphate; stabilizers against ageing and weathering; plasticizers; fungistatic and bacteriostatic substances; and fillers, such as barium sulphate, kieselguhr, carbon black or whiting.

Other examples of surface-active additives, foam stabilizers, cell regulators, reaction retarders, stabilizers, flame-retarding substances, plasticizers, dyes, fillers and fungistatic and bacteriostatic substances optionally used according to the invention and details concerning the use and mode of action of these additives may be found in Kunststoff-Handbuch, Volune VII, published by Vieweg and Hochtlen, Carl-Hanser-Verlag, Munich 1066, pages 103 to 113.

Other starting materials optionally included according to the invention for producing the synthetic resins are compounds which contain at least two hydrogen atoms capable of reacting with isocyanates and which generally have a molecular weight of from 400 to 10,000. These compounds include not only compounds containing amino groups, thiol groups or carboxyl groups, but especially also polyhydroxyl compounds, and in particular compounds containing from 2 to 8 hydroxyl groups, especially those with a molecular weight of from 800 to 10,000 and preferably from 1000 to 6000. Examples include polyesters, polyethers, polythioethers, polyacetals, polycarbonates and polyester amides containing at least two, generally from 2 to 8 and preferably from 2 to 4 hydroxyl groups of the type which are used and generally known for the production of both homogeneous and cellular polyurethanes.

Suitable polyesters with hydroxyl groups include the reaction products of polyhydric, preferably dihydric, alcohols with the optional addition of trihydric alcohols, with polybasic, preferably dibasic, carboxylic acids. Instead of using free polycarboxylic acids, the corresponding polycarboxylic acid anhydrides or esters of lower alcohols or mixtures thereof may be used for preparing the polyesters. The polycarboxylic acids may be aliphatic, cycloaliphatic, aromatic and/or heterocyclic and may be substituted, e.g. with halogen atoms, and/or be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid optionally mixed with monomeric fatty acids, dimethyl terephthalate and bis-glycol terephthalate. Suitable polyhydric alcohols include, e.g. ethylene glycol, propylene-1,2-and -1,3-glycol, butylene-1,4- and -2,3-glycol, hexane-1,6-diol, octane-1,8-diol, neopentyl glycol, cyclohexane dimethanol (1,4-bis-hydroxymethyl cyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl endgroups. Polyesters of lactones, such as $\epsilon$-caprolactone, or hydroxycarboxylic acids, such as $\omega$-hydroxycaproic acid, may also be used.

The polyethers useable include those which contain at least two, generally from two to eight and preferably two to three hydroxyl groups, and are also known. They may be prepared by polymerization of epoxides, such as ethylene oxide, propylene oxide, butylene oxide, tetrahydrofuran, styrene oxide or epichlorohydrin, either alone, e.g. in the presence of $BF_3$, or, by an addition reaction of these epoxides, optionally as mixtures or successively, to starting components which contain reactive hydrogen atoms, such as water, alcohols or amines including ethylene glycol, propylene-1,3- or -1,2-glycol, trimethylolpropane, 4,4'-dihydroxydiphenylpropane, aniline, ammonia, ethanolamine or ethylene diamine. Sucrose polyethers such as those described in German Auslegeschrift Nos. 1,176,358 and 1,064,938 may also be used according to the invention. It is frequently preferred to use polyethers which contain predominant amounts of primary OH-groups (up to 90%, by weight, based on all the OH-groups present in the polyether). Polyethers which are modified with vinyl polymers, e.g. the polyethers obtained by polymerizing styrene or acrylonitrile in the presence of polyethers (U.S. Pat. Nos. 3,383,351; 3,304,273; 3,523,093 and 3,110,695, and German Patent 1,152,536) as well as polybutadienes which contain OH-groups are also suitable.

Suitable polythioethers include the condensation products obtained by condensing thiodiglycol either on its own and/or with other glycols, dicarboxylic acids, formaldehyde, aminocarboxylic acids or amino alcohols. The products obtained are polythio mixed ethers, polythioether esters or polythioether ester amides, depending on the co-components.

Suitable polyacetals include the compounds which may be prepared from glycols (such as diethylene glycol, triethylene glycol, 4,4'-dioxethoxy-diphenyldimethylmethane and hexane diol) and formaldehyde. Polyacetals suitable for the purpose of the invention may also be obtained by polymerizing cyclic acetals.

Suitable polycarbonates which contain hydroxyl groups are known, and include the compounds obtained by reacting diols (such as propane-1,3-diol, butane-1,4-diol and/or hexane-1,6-diol, diethylene glycol, triethylene glycol or tetraethylene glycol) with diaryl carbonates (such as diphenyl carbonate) or phosgene.

Suitable polyester amides and polyamides include the predominantly linear condensates obtained from polybasic saturated and unsaturated carboxylic acids or anhydrides thereof and polyvalent saturated and unsaturated amino alcohols, diamines, polyamines and mixtures thereof.

Polyhydroxyl compounds which contain urethane or urea groups and modified or unmodified natural polyols, such as castor oil, carbohydrates or starch, may also be used. Addition products of alkylene oxides with phenol-formaldehyde resins or with ureaformaldehyde resins may also be used according to the invention.

Examples of these compounds which may be included according to the invention are known and have been described, e.g. in High Polymers, Volume XVI, "Polyurethanes, Chemistry and Technology", published by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich 1966, pages 45 to 71.

Compounds with a molecular weight of from 32 to 400 which contain at least two hydrogen atoms capable of reacting with isocyanate may also be used as starting components according to the invention. These substances are also compounds which contain hydroxyl groups and/or amino groups and/or thio groups and/or carboxyl groups. Preferably, these compounds have hydroxyl groups and/or amino groups, and serve as chain-lengthening or cross-linking agents. These compounds generally contain from 2 to 8 hydrogen atoms capable of reacting with isocyanates, preferably 2 or 3 such hydrogen atoms. The following are mentioned as examples of such compounds: ethylene glycol, propylene-1,2- and -1,3-glycol, butylene-1,4- and -2,3-glycol, pentane-1,5-diol, hexane-1,6-diol, octane-1,8-diol, neopentyl glycol, 1,4-bishydroxymethyl cyclohexane, 2-methyl-1,3-propanediol, glycerol, trimethylolpropane, hexane-1,2,6-triol, trimethylolethane, pentaerythritol, quinitol, mannitol and sorbitol, diethylene glycol, triethylene glycol, tetraethylene glycol, polyethylene glycols with a molecular weight up to 400, dipropylene glycol, polypropylene glycols with a molecular weight up to 400, dibutylene glycol, polybutylene glycols with a molecular weight up to 400, 4,4'-dihydroxy diphenylpropane, dihydroxy methyl hydroquinone, ethanolamine, diethanolamine, triethanolamine, 3-aminopropanol, ethylene diamine, 1,3-diaminopropane, 1-mercapto-3-aminopropane, 4-hydroxyphthalic acid or 4-aminophthalic acid, succinic acid, adipic acid, hydrazine, N,N'-dimethyl hydrazine and 4,4'-diaminodiphenylmethane.

According to the invention, the starting components can be reacted together by the known one-step process, prepolymer process or semi-prepolymer process, in many cases using mechanical devices, such as those described in U.S. Pat. No. 2,764,565. Details concerning processing apparatus which may also be used according to the invention may be found in Kunststoff-Handbuch, Volume VI, published by Vieweg and Hochtlen, Carl-Hanser-Verlag, Munich 1966, pages 121 to 205.

IR spectroscopic investigation of the isocyanurate foams produced according to the invention shows high proportions of isocyanurate rings in addition to small quantities of carbodiimide groups.

The foams obtained according to the invention may be used as insulating materials in the building industry or in the technical field or as constructional material and in the furniture industry.

The ether esters obtained according to the invention may also be used as starting materials for the production of cellular or homogeneous polyurethane resins which in turn may be used as coatings, insulations or lacquers.

COMPARISON EXPERIMENTS

1. Solution experiments with tetrabromobisphenol-bis-hydroxyethyl ether:
   (a) 50 parts by weight of the ether were dissolved in 50 parts by weight of triethylene glycol by heating. The bromine content of the solution is approximately 25%. The hydroxyl number of the solution is 464. The solution solidifies to a stiff crystalline paste on cooling to room temperature.
   (b) 50 parts by weight of the above-mentioned ether were dissolved in 50 parts by weight of polyethylene glycol (molecular weight 400). The bromine content is approximately 25% and the hydroxyl number of the mixture 218. The solution solidifies to a crystalline product on cooling to 20° C.
   (c) 50 parts by weight of the above-mentioned ether are dissolved in 50 parts by weight of an ester which contains hydroxyl groups. The ester was prepared by condensing 2 mols of adipic acid with 3 mols of triethylene glycol. The bromine content is about 25% and the hydroxyl number of the solution 175. The solution, which is clear when hot, solidifies to a crystalline product on cooling to room temperature.

EXAMPLE 1

1150 parts by weight of bis-β-hydroxyethyl tetrabromobisphenol, 750 parts by weight of triethylene glycol, 403 parts by weight of adipic acid and 2 parts by weight of titanium tetrabutylate are heated to 170° C. for 19 hours in a conventional esterification apparatus and stirred while nitrogen is passed through it. The acid number drops to 3.5 mg of KOH per g. over a condensation time of 15 hours and does not drop any further thereafter. The reaction mixture is cooled to from 120° to 125° C. and the acid number is reduced to zero by the introduction of ethylene oxide over a period of 6 hours. The reaction mixture is then stirred under vacuum at from 80° to 100° C. for 1 hour to remove unreacted ethylene oxide dissolved therein.

2180 parts by weight of a brownish-colored oil are obtained. The product contains approximately 52% of tetrabromobisphenol bis-ether.

The following analytical data are obtained from the product:

| viscosity: | 66 p/25° C |
|---|---|
| OH-number: | 195 |
| bromine content: | 25.3–25.4% |

The product retains its liquid consistency even when stored at from 0° to 10° C.

EXAMPLE 2

1150 parts by weight of bis-β-hydroxyethyl tetrabromobisphenol, 750 parts by weight of triethylene glycol, 520 parts by weight of adipic acid, 18.5 parts by weight of maleic acid anhydride, and 2 parts by weight of titanium tetrabutylate are heated to 170° C. for 24 hours as described in Example 1. At the end of this time, the esterification product has an acid number of 4, which is reduced to zero by treating the product with ethylene oxide at 130° C.

2310 parts by weight of a brownish, viscous oil which has the following characteristics are obtained:

| viscosity: | 140 p/25° C |
|---|---|
| bromine content: | 24.0 – 24.1 % |
| OH-number: | 150-151 |

The product remains liquid when cooled.

EXAMPLE 3

1150 parts by weight of bis-β-hydroxyethyl tetrabromobisphenol, 750 parts by weight of triethylene glycol, 420 parts by weight of tetrahydrophthalic acid, and 2 parts by weight of titanium tetrabutylate are heated to 170° C. for 24 hours as described in Example 1, the acid number dropping to 4 in the course of this time. The reaction product is cooled to 125° C. Ethylene oxide is then introduced for several hours, during which time the acid number drops to zero. The esterification mixture is heated to 120° C. under a vacuum for 1 hour to remove unreacted ethylene oxide. The resultant product is a brownish-colored oil which shows no tendency to crystallization even when left to stand at low temperatures for some time.

| Data: | |
|---|---|
| viscosity: | 200 p/25° C |
| bromine content: | 25.2–4% |
| OH-number: | 203 |

EXAMPLE 4

230 parts by weight of bis-β-hydroxyethyl tetrabromobisphenol, 75 parts by weight of triethylene glycol, 100 parts by weight of polyethylene glycol (molecular weight 400), 73 parts by weight of adipic acid and ½ part by weight of titanium tetrabutylate are heated to from 160° to 167° C. for 21 hours as described in Example 1. The acid number of the resulting ester is 2.3. The reaction mixture is then treated with ethylene oxide at from 118° to 122° C. to eliminate the acid number.

470 parts by weight of a dark-brown resins which has the following characteristics are obtained:

| viscosity: | 140 p/25° C |
|---|---|
| bromine content: | 24.8–25% |
| OH-number: | 151-153 |

EXAMPLE 5

1896 parts by weight of bis-β-hydroxyethyl tetrabromobisphenol, 1125 parts by weight of diethylene glycol and 1023 parts by weight of adipic acid are heated to 160° C. for 33 hours while nitrogen is passed through the mixture. The acid number of the esterification product at the end of this time is 5.4. The reaction mixture is then treated with ethylene oxide at 130° C. until no acid number can be found.

3440 parts by weight of a brownish, viscous oil which has the following characteristics are obtained:

| viscosity: | 70 p/25° C |
|---|---|
| bromine content: | 23.0 – 23.2% |
| OH-number | 186–188 |

EXAMPLE 6

990 parts by weight of tetrabromobisphenol are dissolved in 750 parts by weight of triethylene glycol with the addition of 2 parts by weight of sodium phenolate and heated to 125° C. with stirring. 190 parts by weight of ethylene oxide are then introduced at a temperature of from 125° to 130° C. in the course of 7½ hours. A vacuum is applied when all the ethylene oxide has been added, and the reaction mixture is maintained at from 125 to 130° C. for 1 hour with stirring to remove unreacted ethylene oxide. The reaction mixture solidifies to a crystalline mass on cooling. 403 parts by weight of adipic acid and 2 parts by weight of titanium tetrabutylate are then added under normal pressure at a temperature of 110° C. The reaction mixture is heated to 160° C. for 1 hour while nitrogen is introduced and it is then stirred at this temperature for 4 hours. 57 parts by weight of H₂O distil off during this time. A vacuum is then applied and heating is continued at a pressure of from 16 to 18 Torr for 3 hours, during which time a further 20 parts by weight of water is split off. A pale-yellow, viscous oil which has the following characteristics is obtained:

| viscosity: | 52 p/25° C |
|---|---|
| bromine content: | 26.0% |
| OH-number: | 197 – 203 |
| acid number: | 1.2 |

EXAMPLE 7

A mixture of 66.7 parts by weight of the polyether ester from Example 2, 33.3 parts by weight of a propoxylated ethylene diamine (OH-number 650), 1 part by weight of a commercial foam stabilizer (L 5320, Union Carbide Co.), 1 part by weight of triethylamine and 25 parts by weight of trichlorofluoromethane is vigorously mixed with 100 parts by weight of a crude 4,4'-diphenylmethane diisocyanate (NCO content 31% b.w.) by stirring for 5 seconds. The setting time is 15 seconds. A hard polyurethane foam which is "normally inflammable" according to DIN 4102 and has a gross density of 30 kg/m² is obtained, whereas foams which do not contain the polyether ester according to the invention, but are otherwise similar are found to be "easily inflammable".

EXAMPLE 8

A mixture of 30 parts by weight of the polyether ester from Example 4, 10 parts by weight of trichloroisopropyl phosphate, 3 parts by weight of the aminopolyether from Example 7, 1 part by weight of glycerol, 1 part by weight of the stabilizer from Example 7, 1.5 parts by weight of a 25% solution of potassium acetate in diethylene glycol and 22 parts by weight of trichloro fluoromethane is mixed with 100 parts by weight of an isocyanate prepolymer in an HK 500 foaming machine manufactured by Hennecke/Birlinghoven. The prepolymer was prepared from 95 parts by weight of the isocyanate from Example 7 and 5 parts by weight of a polypropylene glycol with OH-number 200. The reaction mixture is introduced for 15 seconds into a mold measuring 1 × 1 m. The foam rises to a height of about 50 cm and sets after 40 seconds.

The foam, which contains predominantly polyisocyanurate groups, has a gross density of 35 kg/m³ and is classified as "flame-resistant" according to DIN 4102. The block of foam can be cut up into panels and semi-finished half shells which can be used as insulating material in building constructions and for insulating pipes.

EXAMPLE 9

The procedure is the same as in Example 8, but the quantity of catalyst (potassium acetate solution) is increased to 2.0 parts by weight and in addition 0.5 parts by weight of tris(dimethylaminomethyl)-phenol are used. This formulation is worked-up in a commercially available double conveyor belt installation manufactured by Hennecke/Birlinghoven, Siegkreis. Polyethylene-coated aluminum foils are used as covering layers. The foam adheres firmly to these layers. The panels can be used for roofing buildings. If in this formulation the polyether ester according to the invention is replaced by a bisphenol-A-polyether (with the same bromine content) which has been brominated according to U.S. Application Ser. No. 373,230 filed July 3, 1972 the foam will not adhere to the covering layers because it is brittle on the surface.

It is to be understood that any of the components and conditions mentioned herein as suitable can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A liquid polyetherester which contains hydroxyl groups and has an acid number of from 0 to 5, a hydroxyl number of from 100 to 300 and a viscosity of from 10 to 200 poises at 25° C. obtained by the esterification of:
    (a) a bis-hydroxyalkyl ether of halogenated 2,2-diphenylolpropane corresponding to the general formula:

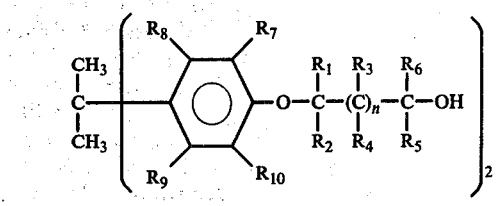

wherein
$n = 0$ or 1;
$R_1$ through $R_6$ may be the same or different and represent H, or $C_1$–$C_4$ alkyl; and
$R_7$ through $R_{10}$ may be the same or different and represent H, $C_1$–$C_4$ alkyl or halogen, at least one of the groups $R_7$–$R_{10}$ being a halogen atom; and
   (b) a polycarboxylic acid selected from the group consisting of saturated, unsaturated, aromatic polycarboxylic acids and mixtures thereof;
   (c) in the presence of an excess of a dihydric alcohol corresponding to the following formula:

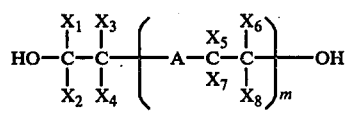

wherein
$X_1$ through $X_8$ are the same or different and represent H, or $C_1$–$C_4$ alkyl;
$m = 1$–10, and
A represents O or S, and the reaction temperature is from 120° C. to 200° C.

2. The polyetherester of claim 1 wherein said polyetherester has an acid number of from 0 to 1, and a hydroxyl number of from 150 to 250, and wherein
    (A) $R_1$ through $R_6$ represent H, $CH_3$ or $C_2H_5$,
    (B) $R_7$ through $R_{10}$ represents H, Br, Cl, $CH_3$ or $C_2H_5$, and at least one of $R_7$ through $R_{10}$ represents Br, and
    (C) $X_1$ through $X_8$ represent H, $CH_3$ or $C_2H_5$.

3. The polyetherester of claim 1 wherein the esterification is conducted by heating to a temperature of from 140° to 170° C.

4. The polyetherester of claim 1, obtained by adding an alkylene oxide, to a solution of a bisphenol which is halogenated in the nucleus in said dihydric alcohol in the presence of one of the known alkoxylation catalysts at a temperature of from 80 to 180° C. until practically all the phenolic hydroxyl groups have been etherified, and then esterifying the resulting mixture of bisphenol ethers which are halogenated in the nucleus and dihydric alcohol by heating with polycarboxylic acids to a temperature of from 120°–200° C.

5. The polyetherester of claim 4, wherein said alkylene oxide is selected from the group consisting of propylene oxide and ethylene oxide, wherein the etherification is conducted at a temperature of from 110° to 140° C., wherein the esterification is conducted at a temperature of from 140° to 170° C. in the presence of an esterification catalyst.

6. The polyetherester of claim 2 which has a bromine content of from 20 to 30%, and is obtained by esterification of 1 mol of bis-$\beta$-hydroxyethyl tetrabromobisphenol with from 2 to 2.5 mol of adipic acid in the presence of from 3.0 to 3.5 mol of diethylene glycol.

7. The polyetherester of claim 2 which has a bromine content of from 20 to 30%, and is obtained by esterification of 1 mol of bis-β-hydroxyethyl tetrabromobisphenol with from 1.25 to 2.0 mol of adipic acid in the presence of from 2.5 to 3.0 mol of triethylene glycol.

8. In a process for producing a polyurethane by reacting a polyisocyanate with an active hydrogen containing material in the presence of a urethane forming catalyst, the improvement which comprises using as said active hydrogen containing material the polyetherester of claim 1.

9. In a process for producing a polyisocyanurate by polymerizing a polyisocyanate with an active hydrogen containing material in the presence of a trimerizing catalyst, the improvement which comprises using as said active hydrogen containing material the polyetherester of claim 1.

* * * * *